US010118598B2

(12) United States Patent
Akahane et al.

(10) Patent No.: US 10,118,598 B2
(45) Date of Patent: Nov. 6, 2018

(54) VEHICLE BRAKING CONTROL DEVICE

(71) Applicant: TOYOTA JIDOSHA KABUSHIKI KAISHA, Toyota-shi, Aichi (JP)

(72) Inventors: Satoru Akahane, Susono (JP); Koji Yotsuya, Numadu (JP); Hideki Katou, Machida (JP); Satoshi Udaka, Sunto-gun (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 15 days.

(21) Appl. No.: 15/110,797

(22) PCT Filed: Dec. 4, 2014

(86) PCT No.: PCT/JP2014/082769
§ 371 (c)(1),
(2) Date: Jul. 11, 2016

(87) PCT Pub. No.: WO2015/107808
PCT Pub. Date: Jul. 23, 2015

(65) Prior Publication Data
US 2016/0325720 A1    Nov. 10, 2016

(30) Foreign Application Priority Data

Jan. 20, 2014    (JP) .................. 2014-008021

(51) Int. Cl.
*B60T 8/1755* (2006.01)
*B60T 8/172* (2006.01)
*B60T 7/22* (2006.01)

(52) U.S. Cl.
CPC ............ *B60T 8/17558* (2013.01); *B60T 7/22* (2013.01); *B60T 8/172* (2013.01); *B60T 2201/022* (2013.01); *B60T 2201/03* (2013.01)

(58) Field of Classification Search
CPC ........ B60T 8/17558; B60T 8/172; B60T 7/22; B60T 2201/022; B60T 2201/03
(Continued)

(56) References Cited

U.S. PATENT DOCUMENTS 6,131,063 A * 10/2000 Seki ..................... B60T 8/3275
340/575
7,302,328 B2 * 11/2007 Kato ..................... B60T 8/1764
180/443
(Continued)

FOREIGN PATENT DOCUMENTS

DE   10 2011 106 520 A1   12/2011
JP      2005-225447 A      8/2005
(Continued)

OTHER PUBLICATIONS

International Search Report of PCT/JP2014/082769 dated Mar. 16, 2015 [PCT/ISA/210].
(Continued)

*Primary Examiner* — Jaime Figueroa
(74) *Attorney, Agent, or Firm* — Sughrue Mion, PLLC

(57) ABSTRACT

The inventive vehicle braking control device performs a brake assist control of increasing a braking force for avoiding a collision of a vehicle at a more appropriate time. The device comprises a portion which acquires an estimated time until a vehicle reaches to an obstacle; a portion which judges based on a braking operation amount and a braking operation speed value if the driver performed an urgent braking operation; and a portion which determines the start of a braking force assist control when an urgent braking operation is judged in a case that the estimated time is less than a first predetermined time, wherein, if the estimated time is less than a second predetermined time shorter than the first predetermined time, the urgent braking operation is judged
(Continued)

when the braking operation amount exceeds a threshold value irrespective of the braking operation speed value.

6 Claims, 4 Drawing Sheets

(58) Field of Classification Search
USPC .................................................... 701/1, 70
See application file for complete search history.

(56) References Cited

U.S. PATENT DOCUMENTS

| | | | | |
|---|---|---|---|---|
| 7,327,237 | B2* | 2/2008 | Kimura | B60T 7/22 340/436 |
| 7,729,859 | B2* | 6/2010 | Kimura | B60K 26/021 340/435 |
| 7,904,246 | B2* | 3/2011 | Kondoh | B60W 50/16 180/167 |
| 8,918,255 | B2 | 12/2014 | Schaab et al. | |
| 9,545,911 | B2* | 1/2017 | Kim | B60W 10/20 |
| 2002/0101337 | A1* | 8/2002 | Igaki | B60K 31/0008 340/436 |
| 2004/0088097 | A1* | 5/2004 | Fujinami | B60T 7/22 701/70 |
| 2004/0090319 | A1* | 5/2004 | Kimura | B60T 7/22 340/435 |
| 2007/0129891 | A1* | 6/2007 | Yano | B60T 7/22 701/301 |
| 2007/0131468 | A1* | 6/2007 | Bullinger | B60R 21/013 180/282 |
| 2007/0145818 | A1* | 6/2007 | Kobayashi | B60T 7/22 303/113.4 |
| 2007/0288145 | A1* | 12/2007 | Maeda | B62D 15/0285 701/41 |
| 2008/0074246 | A1* | 3/2008 | Isaji | B60T 7/22 340/435 |
| 2008/0269997 | A1* | 10/2008 | Ezoe | B60T 7/22 701/70 |
| 2009/0024282 | A1* | 1/2009 | Roehm | B60R 21/0134 701/45 |
| 2009/0210114 | A1* | 8/2009 | Baumann | B60R 21/0132 701/45 |
| 2010/0006363 | A1* | 1/2010 | Zagorski | B60T 7/22 180/275 |
| 2010/0241329 | A1* | 9/2010 | Fujimura | B60T 7/22 701/70 |
| 2010/0250085 | A1* | 9/2010 | Sugano | B60K 26/021 701/70 |
| 2011/0125372 | A1 | 5/2011 | Ito | |
| 2012/0022759 | A1* | 1/2012 | Inoue | B60K 26/021 701/70 |
| 2012/0166017 | A1* | 6/2012 | Kobayashi | B60T 7/22 701/1 |
| 2013/0261916 | A1* | 10/2013 | Sekiguchi | B60T 7/22 701/70 |
| 2014/0032094 | A1* | 1/2014 | Heinrichs-Bartscher | B60T 7/22 701/301 |
| 2014/0142811 | A1* | 5/2014 | Schaab | B60T 7/042 701/41 |
| 2014/0339889 | A1* | 11/2014 | Mizoguchi | B60T 7/22 303/9.62 |

FOREIGN PATENT DOCUMENTS

| | | |
|---|---|---|
| JP | 2008-049932 A | 3/2008 |
| WO | 2013/088581 A1 | 6/2013 |

OTHER PUBLICATIONS

Written Opinion of PCT/JP2014/082769 dated Mar. 16, 2015 [PCT/ISA/237].

* cited by examiner

[Fig. 1]
(A)
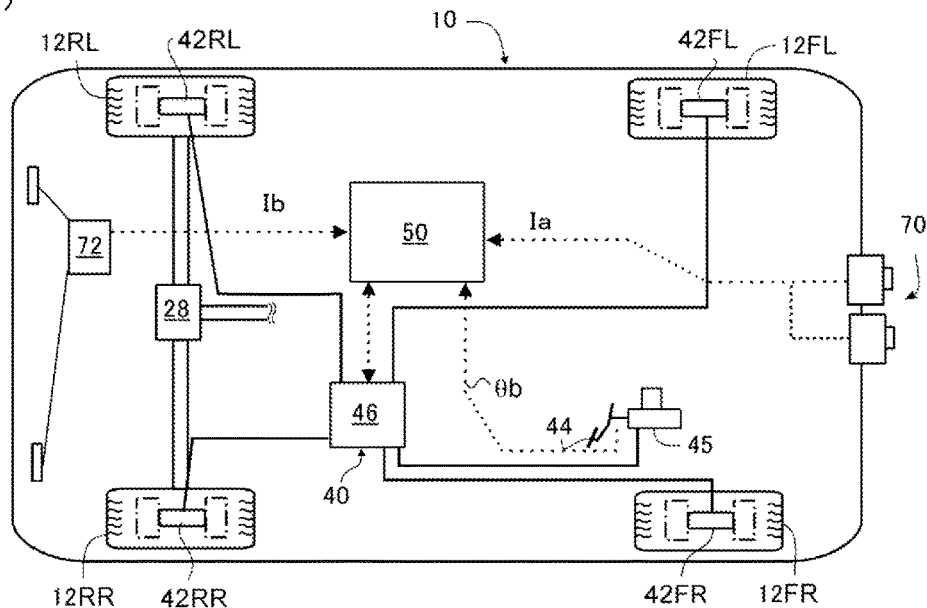
(B)
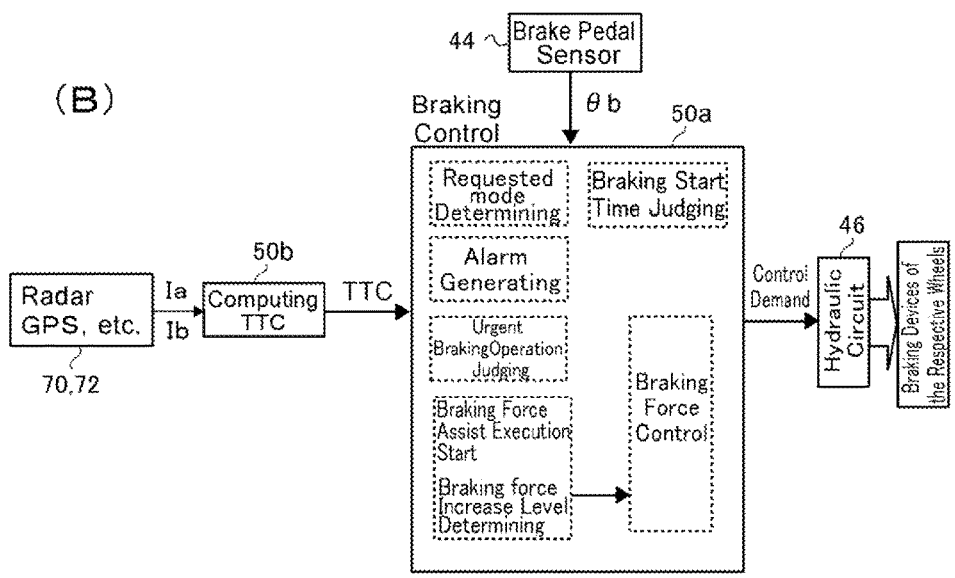

[Fig. 2]
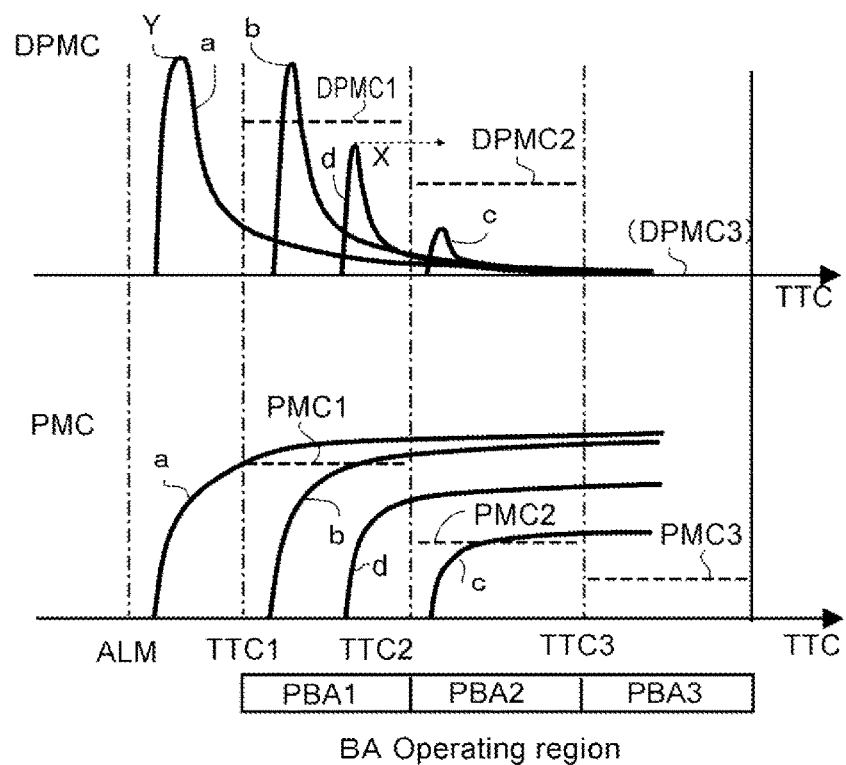

[Fig. 3]
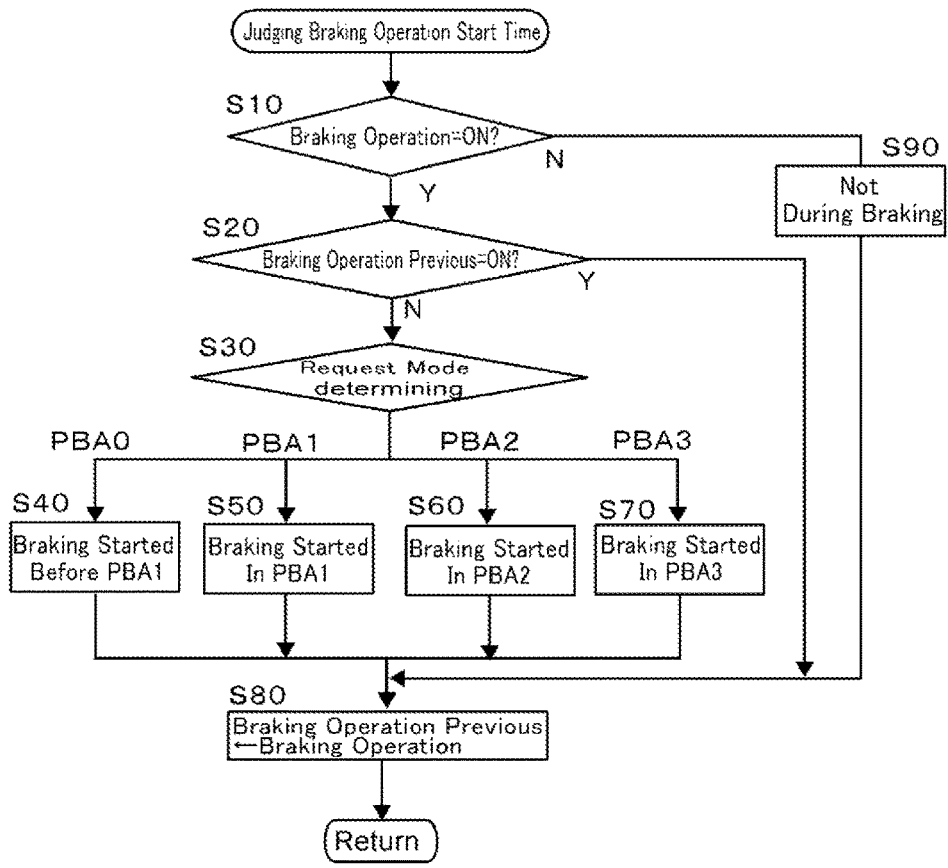

[Fig. 4]
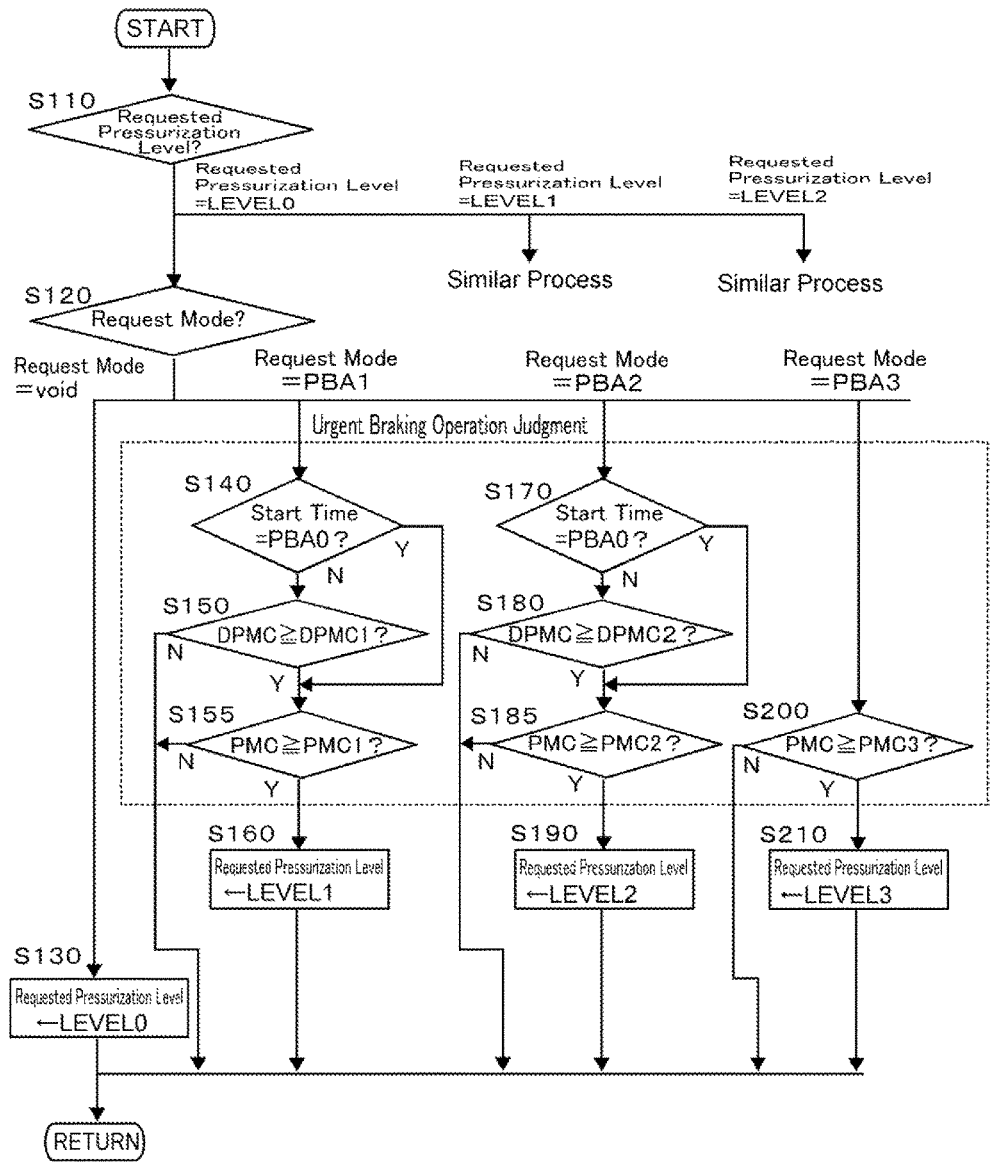

VEHICLE BRAKING CONTROL DEVICE

CROSS REFERENCE TO RELATED APPLICATIONS

This application is a National Stage of International Application No. PCT/JP2014/082769, filed Dec. 4, 2014, claiming priority based on Japanese Patent Application No. 2014-008021, filed Jan. 20, 2014, the contents of all of which are incorporated herein by reference in their entirety.

TECHNICAL FIELD

The present invention relates to a braking control device of a vehicle, such as an automobile, and more particularly relates to a braking control device which performs a braking force assist control (brake assist control) when a possibility of a collision of a vehicle is detected.

BACKGROUND ART

In the field of the braking control for a vehicle, such as an automobile, it has been proposed to perform a braking force assist control (brake assist control) which increases a braking force applied to a vehicle in comparison with that in a usual braking operation when a possibility of a collision of the vehicle is detected. In a system which executes such a braking force assist control when a possibility of a collision of a vehicle is detected, a braking force at a level adequate and agreeable for a driver is applied in a usual braking operation. However, when a possibility of a collision of the vehicle is detected, a braking force larger than usual is applied so that the deceleration of the vehicle will be more ensured for achieving the avoidance of the collision. As an example of performing such a braking force assist control in response to the detection of a possibility of a collision of a vehicle, for instance, patent document 1 discloses a braking control in which a braking force assist is conducted in a brake mechanism when the performing of an urgent depressing operation is detected based on the depression amount and depression velocity of a brake pedal. In this example, when a necessity of a collision avoidance operation is detected based on the distance and relative velocity between the own vehicle and an obstruction, the intervention of the braking force assist is performed in response to the lighting of a stop lamp, and the detection reference value for an urgent depressing operation is lowered in proportion to the increase of the detected collision possibility. Further, patent document 2 proposes a device which controls a braking force for a contact avoidance support based on a target velocity computed according to the distance of an obstacle from a vehicle front, wherein the target velocity is made higher for making the rising of the braking force slower during steering operation, thereby preventing the interference between the automatic braking and the driver's voluntary contact avoidance operation and dissolving the driver's sense of incongruity.

CITATION LIST

Patent Literature

Patent document 1: Japanese Patent laid-open publication No. 2005-225447
Patent document 2: Japanese Patent laid-open publication No. 2008-49932

SUMMARY OF INVENTION

Technical Problem

By the way, for an operation for avoiding a collision of a vehicle when a possibility of the collision is detected, steering may also be performed, other than the braking operation for decelerating the vehicle. Thus, preferably, the braking force assist control for collision avoidance of a vehicle should be performed while preventing a driver who performs steering from feeling incongruity. For example, in a case of trying to avoid the approaching of a vehicle to an obstacle by moderate braking operation and steering operation, if a braking force assist control executes a process of increasing a braking force simultaneously with the moderate braking operation, the driver could feel uncomfortably that the braking force has increased excessively.

Further, in the braking force assist control for a collision avoidance of a vehicle as described above, the process of increasing or amplifying a braking force is preferably to be performed at a time appropriate for the condition of the braking operation urgently performed by a driver and the degree of the possibility of a collision at that time. For instance, in a typical way of performing a braking force assist control in response to the detection of an urgent braking operation by the driver after detection of a possibility of a collision, index values which indicate characteristics of the driver's braking operation, such as the amount of the braking operation (for example, a brake depression amount), the braking operation speed (for example, brake depression speed) are referred to for the judgment of the presence or absence of an urgent braking operation, and the execution of the braking force assist control is started when an urgent braking operation is performed. However, in the period from after a detection of a possibility of a collision to a collision-anticipated time, the necessity for the braking force increase by the braking force assist control varies (usually, the necessity for the braking force increase becomes higher as the collision-anticipated time becomes shorter.), and thus, if an urgent braking operation is judged with a uniform reference, depending upon the severity of the reference, a braking force assist control could be carried out in accordance with the judgment of an urgent braking operation even when the necessity for braking force assist control execution is not so high, or on the contrary, a braking force assist control might not be performed due to the absence of the judgment of an urgent braking operation even when the necessity for braking force assist control execution has become high. Moreover, in a case that the presence or absence of an urgent braking operation is judged with reference to the braking operation amount and braking operation speed, for instance, if a driver's braking operation is started comparatively at an early stage (e.g. before the detection of the possibility of a collision or before the time at which a braking force assist control becomes to be performed), since the braking operation speed is reduced quickly, the value of the braking operation speed has become small until a brake assistant control becomes to be performed, and accordingly, it is possible that no judgment of an urgent braking operation is made and no braking force assist control is performed. Namely, in the braking force assist control performed in response to the detection of a possibility of a collision of a vehicle, it is preferable that the execution of a braking force assist control can be started at a more suitable time in consideration of the condition of a driver's braking operation in more detail.

Thus, one of objects of the present invention is to provide a braking control device to be operated when the possibility of a collision of a vehicle is detected, which device can start the execution of a braking force assist control so as to perform a process of increasing or amplifying a braking force at a more appropriate time based upon various conditions of a braking operation conducted in urgent by a driver.

Moreover, another object of the present invention is to provide a device which performs a braking force assist control as described above, which device can more appropriately make the judgment of the execution start of a braking force assist control in accordance with the time of an urgent braking operation being performed by a driver.

Furthermore, one other object of the present invention is to provide a device as described above, which makes the judgment of the execution start of a braking force assist control, while taking into account that the braking operation speed decreases rapidly from a braking operation start.

A further object of the present invention is to provide a device as described above, which makes the judgment of the execution start of a braking force assist control, taking into account the variation of the necessity for the increase of a braking force in the period from after the detection of the possibility of a collision to a collision-anticipated time.

Solution to Problem

According to the present invention, the above-mentioned object is achieved by a braking control device of a vehicle comprising an estimated time information acquiring portion which acquires information on an estimated time until a vehicle reaches to a position of an obstacle when it exists ahead of the vehicle; an urgent braking operation judging portion which judges whether or not a driver has performed an urgent braking operation based on a braking operation amount and a braking operation speed value of the driver; and a braking force assist control execution determining portion which determines an execution of a braking force assist control when it is judged that the urgent braking operation has been performed in a case that the estimated time is less than a first predetermined time; wherein the urgent braking operation judging portion judges that the urgent braking operation has been performed when the braking operation amount exceeds beyond a predetermined braking operation threshold value irrespective of the braking operation speed value in a case that the estimated time is less than a second predetermined time shorter than the first predetermined time.

In the above-mentioned structure, the detection of the existence of an obstacle ahead of a vehicle and the detection of the estimated time until the vehicle reaches to the position of the obstacle (hereafter, simply referred to as "estimated time".) may be conducted in an arbitrary way, and the inventive device is designed to use such a value of the estimated time or its index value determined in an arbitrary way. The braking operation amount and braking operation speed value are the operation amount and operation speed, corresponding to a braking force, by a driver, respectively, and these are typically the depressing amount and depressing speed of a brake pedal, while they may be an operation amount and an operation speed of an operation trunk, etc. depending upon the type of a braking device of the vehicle. In the judgment of "whether or not the driver has performed an urgent braking operation" by the "urgent braking operation judging portion", typically when the braking operation amount and braking operation speed value exceed beyond corresponding predetermined threshold values, respectively, it may be judged that the driver has performed an urgent braking operation, namely, a quick braking operation in order to avoid the collision of the vehicle to an obstacle. Further, the above-mentioned "first predetermined time" is one of reference times for operating a "braking force assist control (brake assistant control)", namely, a control of generating a larger braking force than that to be generated in accordance with the braking operation amount by the driver (during a normal running), and when the estimated time becomes shorter than the "first predetermined time", the braking force assist control is made to be operated. Furthermore, the "second predetermined time", which is shorter than "the first predetermined time", is another reference time for conducting the judgment of an urgent braking operation based upon whether or not the braking operation amount exceeds beyond a predetermined braking operation threshold value irrespective of the braking operation speed value, and thus, when the estimated time becomes shorter than the "second predetermined time", the judgment of an urgent braking operation will be made in accordance with the magnitude of the braking operation amount.

Thus, in the structure of the above-mentioned device, basically, when an obstacle is found ahead of a vehicle during its running and it is judged that an urgent braking operation is performed in a condition that an estimated time until the vehicle reaches to the obstacle has become shorter than the first predetermined time, a braking force assist control is operated. In that case, in the stage in which the estimated time is shorter than the first predetermined time but longer than the second predetermined time, the judgment of the presence or absence of an urgent braking operation is made based on a braking operation amount and a braking operation speed value. However, in the stage in which the estimated time is shorter than the second predetermined time, the judgment of the presence or absence of an urgent braking operation is made without referring to the braking operation speed value, and if the judgment that an urgent braking operation has been performed is made, a braking force assist control will be operated. According to this structure, in judging the presence or absence of an urgent braking operation for judging whether or not the execution of a braking force assist control is to be started under a condition that a braking operation has been already started in a comparatively early stage, the judgment of an urgent braking operation is made in accordance with the magnitude of the braking operation amount when the vehicle is close to an obstacle so that the estimated time becomes shorter than the second predetermined time, and thus, the execution of a braking force assist control can be started even when the braking operation speed value has become small. In other words, when the estimated time is longer than the second predetermined time, in order to avoid an erroneous decision, it is carefully judged whether or not the driver has performed an urgent braking operation with reference to the braking operation amount and the braking operation speed value, and when the estimated time is shorter than the second predetermined time so that the necessity for a braking force assist control will become higher, the judgment of an urgent braking operation is made easier with reference to the braking operation amount, but not to the braking operation speed value which quickly reduces, and thereby it is more ensured to execute a braking force assist control for attaining the vehicle's safety. According to this manner, in a case that a driver steers while performing a moderate braking operation for collision avoidance, a braking force assist control is not easy to be operated when the estimated time is long, thereby advantageously reducing the possibility that the driver feels sense of incongruity that the braking force is excessive.

Moreover, in order to judge an urgent braking operation more appropriately and thereby make it possible to start execution of a braking force assist control more appropriately, the urgent braking operation judging portion in the above-mentioned inventive device may be designed to judge that an urgent braking operation has been made in response to the braking operation amount exceeding beyond a predetermined braking operation threshold value irrespective of the braking operation speed value in a case that the driver performs a braking operation while the estimated time is longer than the first predetermined time. As already mentioned, the braking operation speed value quickly reduces after the start of a braking operation. Thus, if a driver starts a braking operation before the estimated time becomes shorter than the first predetermined time, it is highly possible that the braking operation speed value has already become small when the estimated time becomes shorter than the first predetermined time. Then, when the estimated time becomes shorter than the first predetermined time after a driver's braking operation was started before the estimated time became shorter than the first predetermined time, the judgment of an urgent braking operation may be conducted in accordance with whether or not the braking operation amount has exceeded beyond the predetermined braking operation threshold value, without referring to the braking operation speed value, so that the braking force assist control can be more surely operated.

By the way, in a control of performing a braking force assist control in response to the judgment of an urgent braking operation, concerned with the present invention, the problem is in that, while the necessity for a braking force assist control becomes larger as the length of the estimated time becomes shorter (with the time progress after the possibility of a collision is detected), the braking operation speed value once increases but quickly reduces after a braking operation start, and therefore, it becomes harder to make the judgment of an urgent braking operation and thereby operate an braking force assist control as the time progresses after a braking operation start in a structure which performs the judgment of an urgent braking operation based on a braking operation amount and a braking operation speed value. Thus, in one manner, the above-mentioned inventive device may comprise a braking operation start time memorizing portion which memorizes a time of starting a braking operation by a driver, and the urgent braking operation judging portion may be designed to change, based on the memorized start time of the braking operation, the process of judging whether or not the driver has performed an urgent braking operation. According to this structure, the start time of a braking operation can be grasped and the judging process for an urgent braking operation can be changed depending upon the start time, and thus, in a case that a braking operation is performed in an early stage or in a case that a moderate braking operation is performed after the estimated time becomes short, etc., it becomes possible to appropriately coordinate the judgment of an urgent braking operation and the start of a braking force assist control more precisely in accordance with the operation time and conditions.

Further, for another manner, the above-mentioned inventive device may comprise an estimated time section determining portion which determines a section to which the length of an estimated time belongs among two or more sections, and the inventive device may be designed such that the urgent braking operation judging portion judges that the driver has performed an urgent braking operation when the braking operation amount and the maximum so far of the braking operation speed value exceed beyond the corresponding threshold values (the braking operation amount to be referred to here may be the value at the judgment time or its maximum so far.), and the respective threshold values for the braking operation amount and braking operation speed value may be set lower as the time length of the determined section of the estimated time is shorter. In an urgent braking operation, as already mentioned, usually, the braking operation speed value once increases and then reduces promptly, and the braking operation amount may also vary by the driver's operation. So, even when an operation which is equivalent to an urgent braking operation is performed before a judgment of an urgent braking operation is made, its condition could be no longer maintained in the braking operation amount and braking operation speed value at the time of the judgment of an urgent braking operation. Thus, in the inventive device, the urgent braking operation judging portion may be designed to judge the presence or absence of an urgent braking operation based upon whether or not the respective maximums so far of the braking operation amount and braking operation speed value exceed beyond the corresponding threshold values so that it can be detected more certainly whether or not an urgent braking operation has been performed (in this regard, since the braking operation amount is not reduced unless a braking operation is loosened, the braking operation amount to be referred to may be the value at the judgment time.). In that case, the necessity for a braking force assist control becomes higher as the estimated time is shorter, and therefore, it may be more ensured that a braking force assist control is performed by setting the threshold values for the braking operation amount and braking operation speed value lower at the time of the judgment of an urgent braking operation so that the judgment of an urgent braking operation will be made easier. According to this way, irrespective of the time of staring the braking operation, the judgment of an urgent braking operation and the start of a braking force assist control are more surely achieved for attaining the vehicle's safety.

In one embodiment, the above-mentioned inventive device may be designed such that, when the braking operation by a driver is started under a condition that the estimated time is between the first predetermined time and the second predetermined time and when the present estimated time is between the first predetermined time and the second predetermined time, the urgent braking operation judging portion judges that the driver has performed an urgent braking operation when the braking operation amount and the maximum so far of the braking operation speed value exceed beyond the corresponding threshold values (the braking operation amount to be referred to here may be the value at the judgment time or its maximum so far.). Namely, when the braking operation by the driver is not so early made and the estimated time is not so short, the judgment of the presence or absence of an urgent braking operation is performed carefully with reference to both braking operation amount and braking operation speed value, and thereby it is avoided to unnecessarily start a braking force assist control. Furthermore, the urgent braking operation judging portion may be designed to judge that the driver has performed an urgent braking operation when the braking operation amount exceeds beyond a predetermined threshold value (the braking operation amount to be referred to here may be the value at the judgment time or its maximum so far.) in a case that a braking operation by a driver is started under a condition that the estimated time is between a predetermined reference time, which is longer than the first predetermined time, and the first predetermined time, namely, at a time arbitrarily set before a braking force assist control becomes to be operated (for example, at a time of generating an alarm for the possibility of a collision occurrence, etc.), or when the present estimated time is shorter than the second predetermined time, namely, when the vehicle and the obstacle have become rather close to each other. That is, when the braking operation speed value has promptly reduced or when the necessity for a braking force assist control has become rather high, the presence or absence of an urgent braking operation is judged by braking operation amount without referring to the braking operation speed value so that a braking force assist control will be more surely executed.

With respect to the increase amount of a braking force during the execution of a braking force assist control, it is necessary to more surely stop a vehicle when the estimated time is short as compared with when the estimated time is long, and therefore, the increase amount of the braking force by the braking force assist control is set larger when the estimated time at which the urgent braking operation judging portion judges that the driver has performed an urgent braking operation is short as compared with when the estimated time is long.

Advantageous Effects of Invention

Thus, generally, according to the structure of the inventive device, in the braking force assist control performed when the possibility of a collision of a vehicle is detected, the height of the necessity for a braking force assist control and the ease of the detection of an urgent braking operation are taken into consideration so that the process of increasing or amplifying a braking force can be carried out at a more appropriate time. Especially, in a case that a driver steers with a moderate braking operation for collision avoidance, the execution start of a braking force assist control will be judged depending upon the length of the estimated time in consideration of the degree of the precision of detection of an urgent braking operation and the necessity for a braking force assist control, and therefore, it will be prevented that the driver uncomfortably feel that a braking force is excessive. Further, since the execution start of a braking force assist control can be judged more precisely, the generation of a driver's sense of incongruity will be suppressed together with the improvement of the safety of a vehicle.

Other purposes and advantages of the present inventions will become clear by explanations of the following preferable embodiments of the present invention.

BRIEF DESCRIPTIONS OF DRAWINGS

FIG. 1 (A) is a schematic diagram of a vehicle equipped with a preferable embodiment of the braking control device of a vehicle in accordance with the present invention, and FIG. 1 (B) is a control block diagram of an electronic control device of the vehicle into which the preferable embodiment of the braking control device of the present invention is incorporated.

FIG. 2 is graph charts explaining the relation between time variations of braking operation amount PMC and braking operation speed value DPMC when the execution of a braking force assist control is to be started and the estimated time used for the judgment for the start of execution of the braking force assist control.

FIG. 3 shows a judgment process of a braking operation start time in a preferable embodiment of the braking control device of the present invention in the form of flow chart.

FIG. 4 shows a series of processes including a process of judging an urgent braking operation, a process of judging a braking force assist execution and a process of judging a braking force increase level in a preferable embodiment of the braking control device of the present invention in the form of flow chart.

REFERENCE SIGNS LIST

10—Vehicle
12 FL-RR—Wheels
28—Differential gear
36L, R—Tie rod
40—Braking device
42FL-RR—Wheel cylinders
44—Brake pedal
45—Master cylinder
46—Hydraulic circuit
50—Electronic control device
70—Radar sensor, Obstacle sensor, etc.
72—GPS device

DESCRIPTION OF EMBODIMENTS

The Structure of Vehicle

FIG. 1 (A) schematically shows an automobile in which a preferable embodiment of the inventive braking control device is incorporated. In this drawing, a vehicle 10 with right and left front wheels 12FL, 12FR and right and left rear wheels 12RL and 12RR is equipped, in a usual manner, with a driving system (only partially illustrated) which generates a braking-driving force on each wheel (only rear wheels, since the illustrated example is a rear drive vehicle) according to the depressing of an accelerator pedal by a driver; a steering device (not shown) for controlling the steering angle of the front wheels (or the front and rear wheels); a braking system 40 which generates a braking force on each wheel. The driving system is designed such that a driving torque or a rotational force is transmitted from an engine and/or a motor (not shown) through a transmission (not shown) and a differential gear 28, etc. to the rear wheels 12RL and 12RR, in a usual manner. In this regard, the vehicle may be a front drive vehicle or a four-wheel drive vehicle, and in such a case, a rotational force of the driving system is transmitted to the front wheels or all the wheels.

The braking system 40 may be an electronically controlled, hydraulic braking device, in which a braking pressure in a wheel cylinder 42$i$ (i=FL, FR, RL, and RR, the same in the followings) equipped for each wheel, i.e., a braking force on each wheel, is adjusted through a hydraulic circuit 46 connected to a master cylinder 45 to be operated in response to the depressing of a brake pedal 44 by the driver. In the hydraulic circuit 46, there are provided in a usual manner various valves (master cylinder cut valves, oil pressure holding valves, pressure reducing valves) which selectively connect the wheel cylinder of each wheel to the master cylinder, an oil pump or an oil reservoir (not shown), and in a usual operation, the pressure in the master cylinder 45 is supplied to each wheel cylinder 42$i$ in response to the depressing of the brake pedal 44. However, in a case that the braking force of each wheel is adjusted in order to perform a braking force assist control in accordance with the present invention or the other arbitrary braking force control, the above-mentioned various valves are operated based on a command of an electronic control device 50 so that the braking pressure in the wheel cylinder of each wheel will be controlled to be conformed with the corresponding target pressure. In this connection, the braking system 40 may be of a type in which a braking force is pneumatically or electromagnetically applied to each wheel or of any other arbitrary type.

Furthermore, in the above-mentioned vehicle 10, there is provided an arbitrary mechanism for detecting the presence of an obstacle ahead of the vehicle during its running and a possibility that the vehicle, if keeps running as it is, would contact the obstacle (a collision possibility detection mechanism). For such a collision possibility detection mechanism, for example, there is provided a detector 70 (a millimeter wave sensor (FMCW type), a radar device, a sonar device, etc.) for measuring a relative distance and a relative velocity with an obstacle (a stationary object, a preceding vehicle, etc.) ahead of the vehicle, and the data output of the instrument is also transmitted to the electronic control device 50, which executes a process for detection of the existence of an obstacle and detection of the relative distance and relative-velocity distance between the own vehicle and the obstacle in an arbitrary manner and computes the remaining estimated time (TTC: Time To Collision) until the own vehicle would contact the obstacle. In this respect, for an alternative manner, the estimated time may be computed by using information on the position and speed of an obstacle ahead of the running vehicle obtained from a GPS device (car-navigation system) 72 which communicates with a GPS satellite and acquires diverse information, including the positional information on the own vehicle, etc.

As already noted, the braking force assist control of the present invention and the operational control of the braking system 40 are performed by the electronic control device 50. The electronic control device 50 may include a microcomputer having CPU, ROM, RAM, and input/output port apparatus mutually connected with bidirectional common bus in a usual form and drive circuits. In the illustrated electronic control device 50, especially for the braking force assist control of the present invention, there are inputted a brake pedal depression amount θb from a sensor provided in the brake pedal; and information, from a radar device, etc. or GPS device, indicating the existence, distance and relative velocity of an obstacle ahead (Ia, Ib). In this regard, various parameters necessary for various controls to be performed in the vehicle of this embodiment, various detected signals, such as the longitudinal G sensor value etc., may be further inputted appropriately.

The Structure of Braking Control Portion

FIG. 1 (B) shows in the form of control block diagram the structure of the braking control portion in the electronic control devices 50, which realizes the braking control device in accordance with the present invention. In this regard, it should be understood that the structures and operations of the illustrated control device are realized by operations of CPU, etc. in the electronic control device 50 during the driving of the vehicle.

Referring to the drawing, in the braking control portion 50a, as noted, a detected value of depression amount θb from the brake-pedal sensor and an index value indicating the remaining estimated time TTC until the own vehicle would contact an obstacle (a value or its function of the estimated time, etc.) are inputted. In this regard, the estimated time TTC may be computed in a TTC computing portion 50b with information, from a radar device, etc. or GPS device, indicating the existence, distance and relative velocity of an obstacle ahead of the vehicle (Ia, Ib) in an arbitrary manner. Then, in the braking control portion 50a, there may be realized a series of portions which execute the respective processes, using the inputted information in accordance with executions of programs memorized in a memory device: a request mode determining portion; an alarm generating portion; a braking start time judging portion; an urgent braking operation judging portion; and a braking force assist execution start determining and braking force increase level determining portion; and a braking force control processing portion.

Concretely in the braking control portion 50a, the following processes are executed:

(i) The request mode determining portion determines the time section of the inputted estimated time TTC (Request mode) according to the length of the estimated time TTC. As explained later, in the inventive braking force assist control, the process to be executed will be changed depending upon the length of the remaining estimated time until the own vehicle would contact an obstacle, and the request mode is the time section which determines the process to be executed.

(ii) The alarm generating portion refers to the estimated time TTC and generates an alarm informing the driver of the possibility that the vehicle would contact an obstacle with a sound or an indication when the inputted estimated time TTC becomes shorter to a reference time determined with a map etc. prepared beforehand, and thereby, the driver will be urged to perform a braking operation.

(iii) The braking start time judging portion judges a request mode to which the start time of a braking operation belongs when it is made by the driver depressing the brake pedal.

(iv) The urgent braking operation judging portion judges whether or not the driver has performed an urgent braking operation with reference to the depressed amount of the brake pedal (braking operation amount) and its time variation (braking operation speed value).

(v) The braking force assist execution determining and braking force increase level determining portion determines the increase level of a braking force in accordance with the request mode and commands the execution start of a braking force assist in response to the judgment that an urgent braking operation has been performed.

(iv) The braking force control processing portion determines the magnitude of a braking force to be generated on each wheel with reference to the depressed amount of the brake pedal θb, and thereby a control demand for realizing the determined braking force as a target value is given to the hydraulic circuit 46.

The Operations of Braking Control Portion

In the above-mentioned braking control device of the present invention, briefly, when an urgent braking operation is performed under a condition that an estimated time TTC is shorter than a predetermined time, there will be performed a braking force assist control (brake assist control) which increases a braking force relative to that corresponding to the depressed amount of the brake pedal in a normal condition. Especially in this control of the present invention, it is taken into account that the degree of the necessity for a braking force assist control and the ease of detection of an urgent braking operation vary with time, and then, the structure of the process of detecting an urgent braking operation is changed depending upon the time of a braking operation being performed relative to the estimated time TTC, so that a braking force assist control can be made executable at more appropriate time. In the followings, the general operations and concrete processes of the braking force assist control in accordance with the present invention will be explained.

Referring to FIG. 2, first, in the inventive braking force assist control, as already noted, when an estimated time TTC is given from the TTC computing portion 50b to the braking control portion 50a, the request mode is determined according to the length of the estimated time TTC. Concretely, as shown in the lower part of FIG. 2, the request mode is set as follows:

If TTC1≥TTC>TTC2, Request mode=PBA1;
If TTC2≥TTC>TTC3, Request mode=PBA2; and
If TTC3≥TTC, Request mode=PBA3.

(BA Operating Region). In this regard, while no braking force assist control is operated if TTC1<TTC, the alarm generating portion may be designed to generate an alarm of the possibility that the own vehicle would contact an obstacle, if ALM≥TTC, prompting the driver to perform a braking operation.

Then, principally, when the driver performs a braking operation under the condition that the request mode is assigned to TTC, and when the depressed amount PMC of the brake pedal and its time variation DPMC exceed beyond the corresponding threshold values PMC 1-3 and DPMC 1-3 in the respective modes, it is judged that the driver has performed a rapid braking, i.e., an urgent braking operation, and in that case, the process of increasing or amplifying a braking force by the braking force assist control is performed. In this connection, with respect to the threshold values PMC 1-3 and DPMC 1-3, since the necessity for a braking force assist control becomes higher as the estimated time TTC is shorter, in order to more surely perform a braking force assist control, the threshold value may be set as follows:

PMC1>PMC2>PMC3
DPMC1>DPMC2>DPMC3

(However, as understood from the explanation described later, there is no need to set out DPMC3.)

In a structure as described above, for instance, in a case that a rapid braking operation is started when the estimated time TTC is in the range of the request mode=PBA1 as shown with b in the drawing, PMC and DPMC exceed beyond the corresponding threshold values so that the judgment of an urgent braking operation will be made, and thus, a braking force assist control will be performed. However, as shown with a in the drawing, in a case that a rapid braking operation is started before the estimated time TTC becomes shorter than TTC1, and after this, when the estimated time TTC becomes shorter than TTC1, although PMC1 maintains a value which is no less than the threshold value, DPMC has already reduced, and therefore, if the judgment of the presence or absence of an urgent braking operation is made with reference to whether or not both the PMC and DPMC exceeded beyond the respective threshold values, the judgment of the presence of an urgent braking operation could not be obtained even if a strong braking operation equivalent to an urgent braking operation has been performed. In this respect, if it is designed that the judgment of the presence or absence of an urgent braking operation is executed only with reference to PMC, without DPMC, because of taking into account that DPMC rapidly reduces after a braking operation start, it is possible that, for example, as shown with c in the drawing, even in a case that the driver performs a moderate braking operation together with a steering operation for avoiding an obstacle in response to an alarm, a braking force assist control would be started just after PMC exceeds beyond the threshold value, which would make the driver feel incongruity due to the occurrence of the increase of the braking force. Therefore, when the necessity for a braking force assist control is not so high, it is preferable that the judgment of the presence or absence of an urgent braking operation is executed carefully with reference to DPMC. On the other hand, when the estimated time TTC is so short that the request mode is set out to be PBA3 (Request mode=PBA3), the necessity for a braking force assist control becomes very high, and thus, it is preferable to surely judge an urgent braking operation so that a braking force assist control will be performed. Furthermore, as shown with d in the drawing, in a case that a braking operation is started in the range of the request mode=PBA1 and DPMC does not exceed beyond the threshold value DPMC1 for the request mode=PBA1 just after the braking start, and, DPMC, which once exceeded beyond the threshold value DPMC2 just after braking start, has already reduced when the estimated time TTC becomes in the range of the request mode=PBA2, there would be no chance that the judgment of the presence of an urgent braking operation is made, and in this case, no braking force assist control would be executed.

Then, in the present invention, taking into account that DPMC rapidly decreases after it increases once and that the driver would feel incongruity if a braking force assist control is excessively performed, in order to perform a braking force assist control more appropriately, the way of judgment of the presence or absence of an urgent braking operation is changed in accordance with the time of starting a braking operation and the request mode. Concretely, (i) During the estimated time TTC being in the range of request mode=PBA3, the judgment of the presence of an urgent braking operation is made when PMC exceeds beyond the threshold value PMC3, irrespective of DPMC.

(ii) When a braking operation is made during the estimated time TTC being longer than TTC1, the judgment of the presence of an urgent braking operation is made when PMC exceeds beyond the threshold value PMC1-3, irrespective of DPMC.

(iii) During the estimated time TTC being in the range of the request modes=PBA 1-2, the judgment of the presence of an urgent braking operation is made when DPMC and PMC exceeded beyond the respective threshold values. In this case, for DPMC and PMC, their maximums so far are referred to.

FIG. 3 shows the process of the braking start time judging portion used for performing the above-mentioned way of judging the presence or absence of an urgent braking operation in the form of flow chart. In this regard, the illustrated process is a cyclic process repetitively executed during the running of the vehicle. Referring to the drawing, in the braking start time judging process, first, there are executed a judgment of whether or not a braking operation is performed (step 10) and a judgment of whether or not a braking operation was performed in the last cycle (step 20). These judgments may be done with reference to whether or not an output value of a brake pedal sensor is a significant value (a larger value than 0, etc.) or the ON/OFF state of a switch of a brake-pedal sensor or a stop lamp switch. When no braking operation is performed, "not during braking" (no braking being operated) is judged, and when a braking operation value is ON (during braking being operated) and the previous braking operation value is also ON, this means that the braking operation has been already started (the braking start has been judged in the last cycle or the further preceding cycle), and therefore, the current braking operation value is set to the previous braking operation value (step 80), and the current cycle is ended and the next cycle is started. On the other hand, when the braking operation value of step 10 is ON and the previous braking operation value of step 20 is OFF, this means that a braking operation has been started in this time, and therefore, using the estimated time TTC, the request mode at the time of the braking operation start is determined as follows (Step 30):

Request mode=PBA0, if ALM≥TTC>TTC1 (step 40).
Request mode=PBA1 if TTC1≥TTC>TTC2 (step 50).
Request mode=PBA2 if TTC2≥TTC>TTC3 (step 60).
Request mode=PBA3 if TTC3≥TTC (step 70).

When the request mode at the time of the braking operation start is determined as noted above, this status is used in an urgent braking operation judging process, a braking force assist execution determining process and a braking force increase level determining process, illustrated in FIG. 4 in the form of flow chart. In this regard, the illustrated process is a cyclic process repetitively executed during the running of the vehicle, also. Referring to the drawing, in the illustrated process, first, a requested pressurization level, currently set out, is identified (step 110). The "requested pressurization level" is the level of the amount of the increment of a braking force in performing a braking force assist, and when a requested pressurization level is set to LEVEL 1-3, a larger braking force is applied than that corresponding to the depressed amount of the brake pedal in a normal condition. The increment, added to the braking force corresponding to the depressed amount of the brake pedal in a normal condition, may be increased in the order of LEVEL 1, LEVEL 2 and LEVEL 3. Also, in a normal condition, the requested pressurization level is set to LEVEL 0, where no increase of the braking force by the braking force assist is performed. Thus, when the requested pressurization level is LEVEL0, namely, when the braking force assist control has not been performed yet, the identifying of the request mode of the present estimated time TTC is conducted (step 120), and when no request mode is set out (void), namely, when the estimated time TTC has not entered into the zone where a braking force assist control is to be operated, the requested pressurization level is maintained at LEVEL0 (step 130). In this regard, when a rapid braking operation is performed under this condition, this event may be memorized in the process of FIG. 3, but, the requested pressurization level is not set to either of LEVEL 1-3. (Thus, if, because of the braking at this stage, the distance between an obstacle and the own vehicle becomes longer and the estimated time TTC increases, no braking force assist control will be performed.)

Subsequently, when the request mode of the present estimated time TTC becomes PBA1 or PBA2, it is judged if the request mode at the time of the braking operation start is PBA0 (steps 140 and 170). Here, if the request mode at the time of the braking operation start is not PBA0, this means that no braking operation has been started until the estimated time TTC becomes PBA1 or PBA2, and therefore, when both DPMC and PMC are judged to exceed beyond the respective threshold values DPMC1 or 2 (step 150,180) and PMC1 or 2 (step 155,185), the requested pressurization level is set to LEVEL1 or LEVEL2 (step 160,190), and a braking force assist control is performed according to the set level. In this regard, in a case that DPMC does not exceed beyond the corresponding threshold value DPMC1 during the estimated time TTC being in the range of PBA1 while the maximum of DPMC exceeds beyond the threshold value DPMC2 in PBA2 as shown by the curve of DPMC indicated with d in FIG. 2, a braking force assist control should be performed when the estimated time TTC enters into PBA2, and thus, it is preferable that DPMC used for the judgment is its maximum so far. Also, similarly, PMC used for the judgment may be its maximum so far.

On the other hand, when the request mode at the time of the braking operation start is PBA0 in steps 140 and 170, the braking operation has been already started and the possibility that DPMC has reduced is high. Thus, in this case, the judgment for DPMC (step 150,180) is bypassed, and it is judged whether or not PMC exceeds beyond the threshold value PMC1 or 2 (step 155,185). Then, when PMC exceeds beyond the threshold value PMC1 or 2, the requested pressurization level is set to LEVEL1 or LEVEL2 (step 160,190), and a braking force assist control is performed according to the set level.

Furthermore, when the request mode of the present estimated time TTC becomes PBA3, it is preferable that a braking force assist control is performed certainly, and thus, it is judged whether or not PMC exceeds beyond the threshold value PMC3 (step 200) without performing the judgment for DPMC, and when PMC exceeds beyond the threshold value PMC3, the requested pressurization level is set to LEVEL3 (step 210), and a braking force assist control is performed according to the set level.

Although not illustrated in detail, also in a case that the requested pressurization level is set to LEVEL 1-3 once, the processes similar to the above may be carried out. However, that the requested pressurization level has already been set to LEVEL 1 or 2 means that a braking operation have been already performed, and therefore, in the judgment of DPMC and PMC, it may be designed to judge whether or not their maximums so far exceed beyond the corresponding threshold values, respectively.

Then, the operations in accordance with the above-mentioned processes will be reviewed with reference to FIG. 2: In the case of the curve a, since the braking operation is performed before the estimated time TTC enters into PBA1, and thus, during the estimated time TTC progressing in the order of PBA1→PBA2→PBA3, DPMC is not used for the judgment of an urgent braking operation, and the judgment of an urgent braking operation and the determination of the requested pressurization level are made in accordance with the magnitude of PMC. In the case of the curve b, since the braking operation is performed when the estimated time TTC is in PBA1, DPMC is also taken into consideration in the judgment of an urgent braking operation, and a braking force assist control is performed according to the set level. As for the braking operation of the curve d, although it is an operation when the estimated time TTC is in PBA1, the judgment of an urgent braking operation is not made while the estimated time TTC is in PBA1. However, since the maximum X exceeds beyond the threshold value DPMC2 in PBA2, the judgment of an urgent braking operation is made when the estimated time TTC goes into PBA2. The braking operation of the curve c is a moderate braking operation where DPMC is less than the threshold value DPMC2 and it is possible that an avoidance action through steering operation is performed simultaneously, and therefore, while the estimated time TTC is in PBA2, no judgment of an urgent braking operation is made. However, since the necessity for a braking force assist control becomes high when the estimated time TTC enters into PBA3, the judgment of an urgent braking operation is made if PMC exceeds beyond the threshold value PMC3 so that a braking force assist control will be performed.

Thus, according to the structure of the above-mentioned processes, while the start time of a braking operation relative to an estimated time TTC is taken into account, the process of judging an urgent braking operation is changed depending upon the start time of a braking operation and the estimated time TTC, so that the start of the execution of a braking force assist control will be judged more appropriately while preventing a driver from uncomfortably feeling that a braking force is excessive, and thereby, the improvement in the safety of a vehicle will be expected.

Although the above explanations have been made with respect to an embodiment of the present invention, it will be apparent for those skilled in the art that various modifications and changes are possible within the scope of the present invention.

For example, in the illustrated embodiment, the start time of a braking operation start is memorized. However, it may be designed that the respective maximums so far of the braking operation amount and braking operation speed value (for example, the value of Y in the drawing) are memorized, and the memorized maximums are used in the judgments with thresholds for the request mode corresponding to the present estimated time TTC.

The invention claimed is:

1. A braking control device of a vehicle, comprising:
   an estimated time information acquiring portion which acquires information on an estimated time until the vehicle reaches to a position of an obstacle when it exists ahead of the vehicle;
   an urgent braking operation judging portion which judges whether or not a driver has performed an urgent braking operation based on a braking operation amount by the driver and a braking operation speed value by the driver; and
   a braking force assist control execution determining portion which determines an execution of a braking force assist control when it is judged that the urgent braking operation has been performed in a case that the estimated time is less than a first predetermined time;
   wherein the urgent braking operation judging portion judges that the driver has performed the urgent braking operation when the braking operation amount by the driver exceeds beyond a predetermined braking operation threshold value irrespective of the braking operation speed value in a case that the estimated time is less than a second predetermined time which is shorter than the first predetermined time.

2. The device of claim 1, wherein the urgent braking operation judging portion judges that the urgent braking operation has been performed when the braking operation amount exceeds beyond the predetermined braking operation threshold value irrespective of the braking operation speed value in a case that the driver performs a braking operation when the estimated time is longer than the first predetermined time.

3. The device of claim 1, comprising a braking operation start time memorizing portion which memorizes a time when a braking operation by the driver is started,' wherein a process of judging whether or not the driver has performed the urgent braking operation in the urgent braking operation judging portion is varied based upon the memorized braking operation start time.

4. The device of claim 1, comprising an estimated time section determining portion which determines a section to which a length of the estimated time belongs among two or more sections)' wherein the urgent braking operation judging portion judges that the driver has performed an urgent braking operation when the braking operation amount and the maximum of the braking operation speed value so far exceed beyond the corresponding threshold values, and the respective threshold values for the braking operation amount and the braking operation speed value are set lower as the time length of the determined section of the estimated time is shorter.

5. The device of claim 1, wherein, when a braking operation by the driver is started under a condition that the estimated time is between the first predetermined time and the second predetermined time and when the present estimated time is between the first predetermined time and the second predetermined time, the urgent braking operation judging portion judges that the driver has performed an urgent braking operation when the braking operation amount and the maximum so far of the braking operation speed value exceed beyond the corresponding threshold values! and wherein, the urgent braking operation judging portion judges that the driver has performed an urgent braking operation when the braking operation amount exceeds beyond a predetermined threshold value in a case that the braking operation by the driver is started under a condition that the estimated time is between a predetermined reference time, which is longer than the first predetermined time, and the first predetermined time.

6. The device of claim 1, wherein an increase amount of the braking force by the braking force assist control is set larger when the estimated time at which the urgent braking operation judgment portion judges that the driver has performed an urgent braking operation is short as compared with when the estimated time is long.

* * * * *